Dec. 27, 1966 P. R. HELMS 3,293,717
PIPE MOLDING MACHINE
Filed Dec. 16, 1963 2 Sheets-Sheet 1

INVENTOR.
PAUL R. HELMS
BY Newton, Hopkins & Jones
ATTORNEYS

United States Patent Office 3,293,717
Patented Dec. 27, 1966

3,293,717
PIPE MOLDING MACHINE
Paul R. Helms, Rte. 1, Jones Road, Roswell, Ga. 30075
Filed Dec. 16, 1963, Ser. No. 330,711
4 Claims. (Cl. 25—30)

This invention relates to molding machines and more particularly to a molding machine for molding relatively large pipe sections of concrete and like materials.

The relatively wide use of pipe sections molded with concrete, clay, or similar material to form pipe lines, liners for bored wells, or for other purposes has resulted in many attempts to provide molding machines for economically and efficiently molding concrete, clay or similar materials into pipe sections having thin walls. Some of the previous molding machines resulting from these attempts have proven satisfactory for molding pipe sections of relatively small size. However, none of these previous molding machines have proven satisfactory for molding pipe sections of relatively great length and diameter and having thin walls.

This is because pipe sections of relatively great length and diameter and having thin walls are difficult to remove from a mold and are difficult to handle once removed from the mold. Many previous machines have not provided satisfactory means for removing the completed pipe section from a mold or have not provided any convenient means for positioning the pipe section so that it may be easily removed from the machine for curing after it has been molded.

In addition, none of the previous molding machines has provided a satisfactory and efficient means for obtaining a uniform distribution or concentration at high density of a material such as concrete in the relatively long and closely spaced molds required for thin-walled pipe sections having relatively great length. The packing of a material such as concrete to obtain high density and the uniform distribution or concentration of the material throughout the entire length of a mold is essential for a satisfactory pipe section. Previous molding machines have attempted to provide this essential uniform distribution at high density by various tamping arrangements or by compressing the material in the mold from one end of the mold. Those previous molding machines using tamping arrangements not only produce pipe sections having non-uniform distribution of material but are highly inefficient to operate and costly to manufacture and maintain. Those previous molding machines using compression of a material from one end of a mold have failed to provide the required uniform distribution of the material at high density within a mold because of the failure of material within a mold of relatively great length to be uniformly packed by compression at one end of the mold.

The molding machine disclosed herein completely overcomes these and other problems with previous molding machines by providing a mold that is vertically positionable with respect to a support ring which moves within the mold as the vertical position of the mold changes and by providing a compressing member which cooperates with the motion of the mold to compress the material within the mold from both ends between the support ring and a compressing ring moved by the compressing member. The support ring has a fixed vertical position and when the mold is in a raised position, the support ring serves to close the lower end of the mold as a material such as concrete is placed into the mold. Once the material is placed within the mold, the compressing ring attached to the compressing member is placed in the upper end of the mold so as to close the upper end of the mold above the material.

The compressing member serves to move the compressing ring downward relative to the material in the mold and downward motion of the mold serves to move the support ring upward relative to the material in the mold. Thus, the molding machine disclosed herein provides a support ring and a compressing ring at opposite ends of the material with a mold which are independently movable with respect to the material in the mold. The result is that the material within the mold is compressed by motion of the material from both ends of the mold so as to eliminate those problems resulting from the tendency of a material not to move within a mold when compressed from only one end. The downward motion of the mold and the fixed position of the support ring also serve to provide an efficient means for removing the mold from the molded pipe section and for leaving the pipe section in a position in which it may be easily removed from the molding machine for curing.

These and other features and advantages of the present invention will be more clearly understood from the following detailed description and the accompanying drawings in which like characters of reference designate corresponding parts in all figures and in which.

Figure 2:
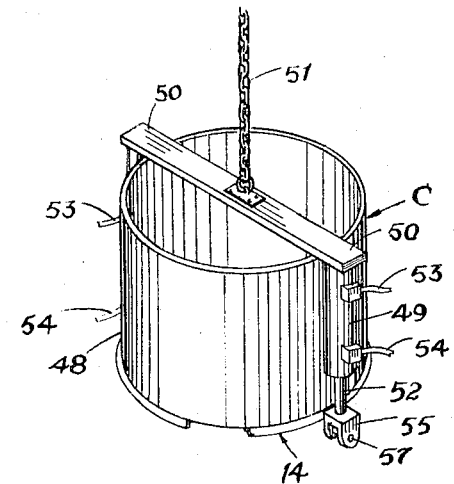
FIG. 2 is a partial section view of the upper end of the mold and the upper end of the support member showing the manner in which a catch member holds the support ring on the support member as the mold is moved upward to a raised position of the mold.
Figure 2:
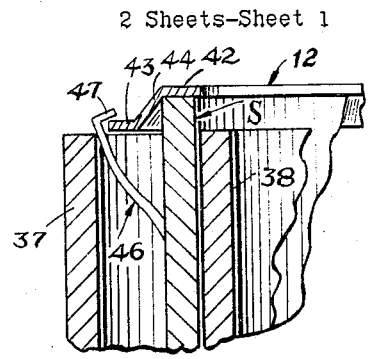

These figures and the following detailed description disclose a preferred specific embodiment of the invention but the invention is not limited to the details disclosed since it may be embodied in other equivalent forms.

The molding machine disclosed herein is best understood as comprising a mold M in which a pipe section E is molded, a mold positioning assembly P for moving the mold M between a raised position and a lowered position, a support member S positioned in the lower end of the mold M when the mold M is in its raised position and within the entire length of the mold M when the mold M is in its lowered position, a support ring 12 positioned on the upper edge of the support member S so as to support the lower end of a pipe section E within the mold M, a compressing ring 14 positionable at the upper end of a pipe section within the mold M, and a compressing member C carrying the compressing ring 14 for forcing the compressing ring 14 downward within the mold M. The mold positioning assembly P comprises two double-acting hydraulic cylinder units 15 and a positioning frame 16 extending between and vertically positionable by the cylinder units 15. The cylinder units 15 are fixedly mounted on a substantially horizontal, relatively strong support surface such as a concrete slab 17 and each cylinder unit 15 has a cylinder 18 with a piston 19 slidably extending from its upper end. At its lower end, the cylinder 18 of each cylinder unit 15 is integral with a flange 20 which is attached by bolts 21 to the concrete slab 17.

Each of the cylinder units 15 is of known type and is responsive in known manner to hydraulic pressure in hydraulic lines 22 and 23 so that hydraulic pressure in the hydraulic lines 22 causes the pistons 19 to retract into the cylinders 18 and hydraulic pressure in the hydraulic lines 23 causes the pistons 18 to extend from the cylinders 18. The cylinder units 15 are spaced apart and vertically positioned on the concrete slab 17 and it will be understood that this arrangement provides a pair of spaced apart pistons 19 which move upward and downward with their centerlines always parallel in response to hydraulic pressure in the hydraulic lines 22 and 23. Any convenient source (not shown) of hydraulic pressure may be used in known manner to provide controlled hydraulic pressure to the hydraulic lines 22 and 23.

Bolts 24 extend upwardly from the upper ends of the pistons 19 and the positioning frame 16 is fixedly, but removably, attached at the upper ends of the pistons 19 by extending the bolts 24 through the midpoints of side members 25 and 26 of the positioning frame 16 and threadably engaging the uppermost ends of the bolts 24 by nuts 27. In the specific embodiment of the invention described herein, the positioning frame 16 is a substantially rectangular metal frame having the side members 25 and 26 parallel and joined by parallel side members 28 and 29. The result is that the positioning frame 16 extends between the pistons 19 of the cylinder units 15 and that by proper control of hydraulic pressure to the hydraulic lines 22 and 23 in known manner, the positioning frame 16 moves toward and away from the concrete slab 17.

The positioning frame 16 has a strut member 30 fixedly positioned between side members 28 and 29 parellel and adjacent to the side member 25, and a strut member 31 fixedly positioned between side members 28 and 29 parallel and adjacent to the side member 26. In addition, a reinforcing block 32 is fixedly positioned between the side member 25 and the strut member 30 at their midpoints and a reinforcing block 33 is fixedly positioned between the side member 26 and the strut member 31 at their midpoints. The reinforcing blocks 32 and 33 serve to provide with the strut members 30 and 31 and the side members 25, 26, 28, and 29, a rigid structure vertically positionable by motion of the pistons 19.

Extending downward from the midpoint of the strut member 30 is a vertical channel member 34 and extending downward from the midpoint of the strut member 31 is a vertical channel member 35. The channel members 34 and 35 extend downward parallel to each other and to the centerlines of the pistons 19, and a beam member 36 is fixedly positioned between the lower ends of the channel members 34 and 35 to complete the mold positioning assembly P.

The mold M comprises a cylindrical outer shell 37 and a cylindrical inner shell 38 fixedly positioned within and concentric with the outer shell 37. The mold M is attached to the mold positioning assembly P by attaching the channel members 34 and 35 to opposite sides of the outer shell 37 of the mold M and by extending the beam 36 through the lower ends of the outer shell 37 and the inner shell 38. The outer shell 37 and inner shell 38 are fixedly attached to the beam 36 and the beam 36 serves to fix the position of the inner shell 38 with reference to the outer shell 37 and to provide a mold M which is moved as a unitary structure by the mold positioning assembly P. The difference between the outer diameter of the inner shell 38 and the inner diameter of the outer shell 37 is selected to provide a space between the inner shell 38 and the outer shell 37 substantially equal to the thickness which is desired for the walls of a pipe section E molded by the molding machine.

The mold M can be replaced by removing the nuts 27 attaching the positioning frame 16 to the pistons 19 and removing the positioning frame 16, the channel members 34 and 35, the beam 36 and the mold M. The support member S is also removed as the mold M is removed as will be understood when the support member S is described below. Removal of the mold M allows other molds (not shown) for molding a pipe section having different diameters than the pipe section E molded by the mold M to be interchanged with the mold M. Thus, the molding machine is readily adaptabe to molding pipe sections of various sizes and shapes.

The support member S is a cylindrical shell having an inner diameter greater than the outer diameter of the inner shell 38 of the mold M and an outer diameter less than the inner diameter of the outer shell 37 of the mold M. The support member S is positioned between the shells 37 and 38 of the mold M with the lower end of the support member S removably attached to the concrete slab 17 by extending bolts 39 through tabs 40 integral with the lower end of the support member S and into the concrete slab 17. Vertical slots 41 are provided in opposite sides of the support member S to permit the beam member 36 to extend between the outer shell 37 and the inner shell 38 and to move vertically with the mold M while the support member S remains stationary. When the bolts 39 are removed, the support member S can be removed with the mold M and interchanged with other support members of proper size to fit other molds interchanged for the mold M as described above.

It will be understood that as the mold positioning assembly P raises and lowers the mold M, the support member S is extended into and withdrawn from the space between the outer shell 37 and the inner shell 38 of the mold M. The vertical height of the support member S is sufficiently greater than the vertical height of the mold M for the upper edge of the support member S to extend above the mold M when the mold M is in a lowered position and the pistons 19 extend upwardly to a sufficient extent to place the upper edge of the support member S at the lower end of the space between the outer shell 37 and the inner shell 38 of the mold M when the mold M is in a raised position.

The support ring 12 is positioned on the upper edge of the support member S and serves to close the lower end of the space between the outer shell 37 and the inner shell 38 of the mold M when the mold M is in a raised position. The specific shape or contour of the support ring 12 is selected in accordance with the shape or contour with which it is desired to provide the lower end of a pipe section E formed by the molding machine; and in the specific embodiment of the invention described herein, the support ring 12 has an inner annular segment 42 resting on the upper edge of the support member S, an outer annular segment 43 concentric with the inner annular segment 42 and below the upper edge of the support member S, and an inclined segment 44 extending downwardly from the inner annular segment 42 to the outer annular segment 43. This support ring 12 contour provides a peripheral lip 45 on a pipe section E formed by the molding machine.

Figure 3:
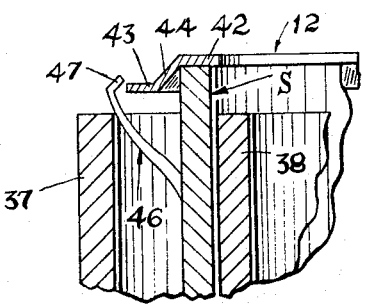
FIG. 3 is a partial section view of the upper end of the mold and the upper end of the support member showing the manner in which a catch member releases the support ring for removal from the support member when the mold is lowered for removal of a pipe section.
Figure 1:
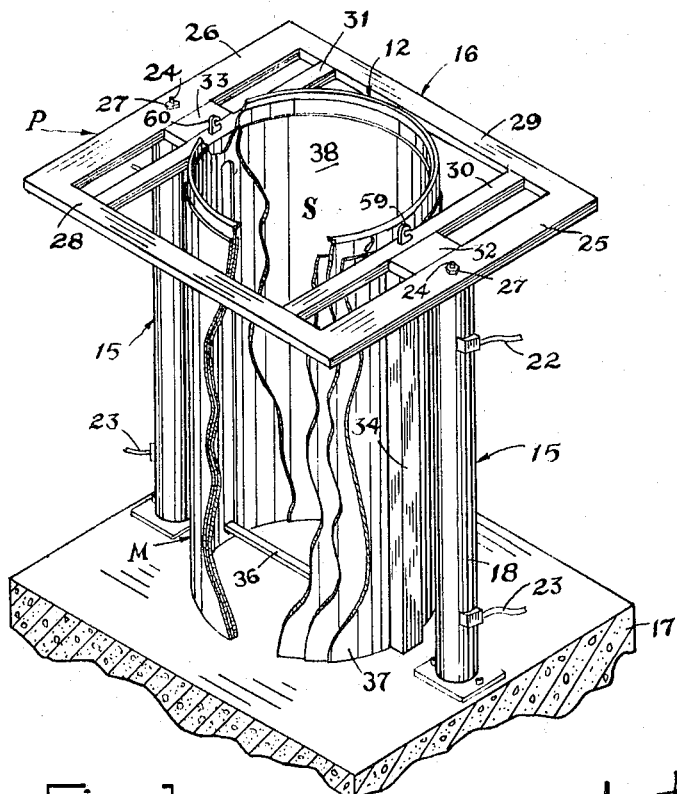
FIG. 1 is a perspective view, partially cut away, of an embodiment of the molding machine showing the mold in its lowered position and the compressing member released from the positioning frame.
Figure 4:
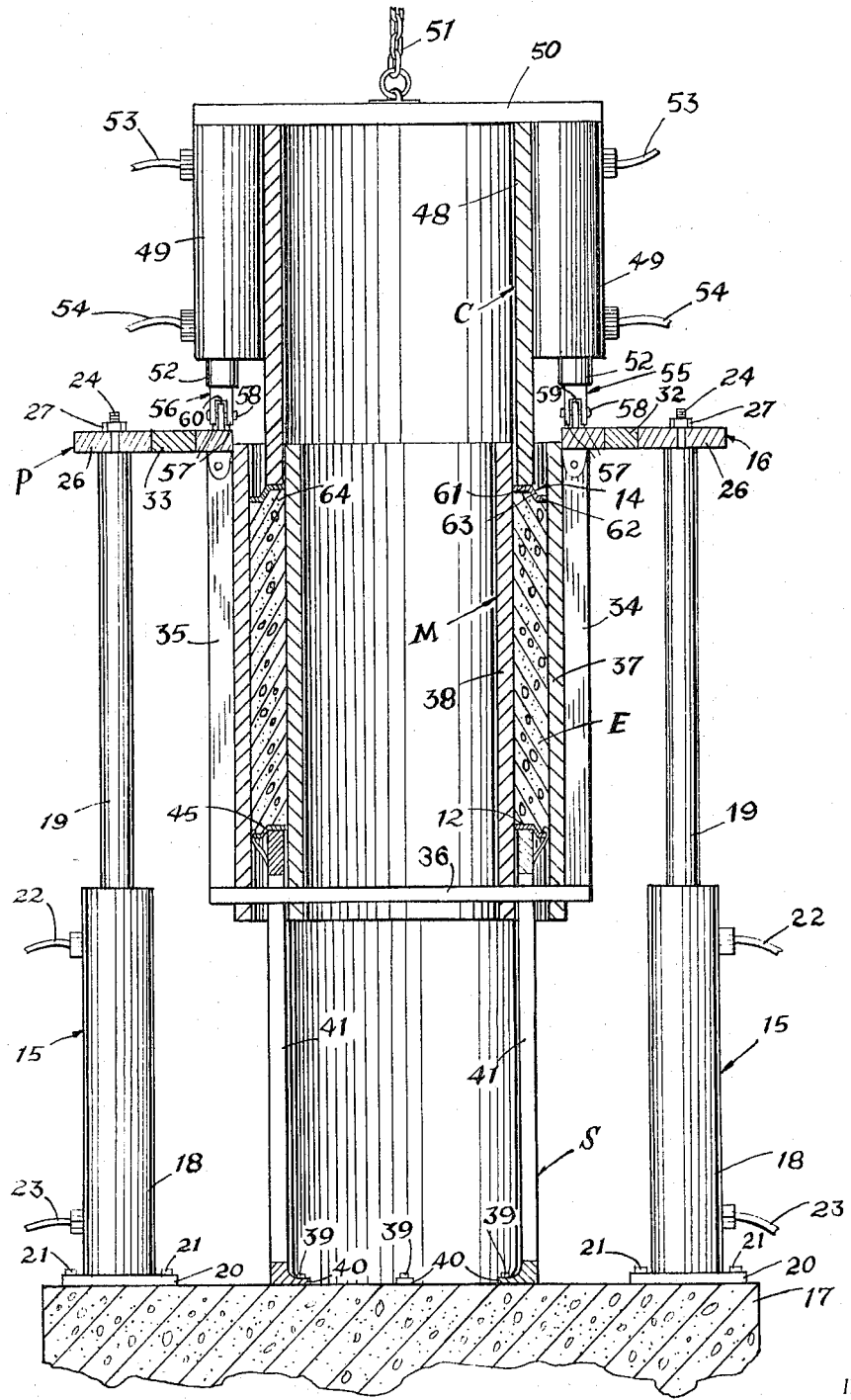
FIG. 4 is a cross-section view of the embodiment of the molding machine shown in FIG. 1 showing a pipe section being molded.

The support ring 12 is maintained in position on the upper edge of the support member S by a plurality of resilient catch members 46. Each of the plurality of catch members 46 is fixedly attached at its lower end to the support member S below the support ring 12 and a hook 47 at the upper end of each catch member 46 engages the outer segment 43 of the support ring 12 when the catch member 47 is pushed inwardly by the outer shell 37 as shown in FIG. 2. It will be understood from FIG. 2 that the catch members 46 are pushed inwardly by the outer shell 37 to firmly hold the support ring 12 in position even though the mold M is in a position which places the support ring 12 above the mold M. It will also be understood from FIG. 3, that if the mold M is lowered to an even lower position than that of FIG. 2, the downward motion of the outer shell 37 relative to the catch members 46, will permit the resilient catch members 46 to pivot outwardly so as to release the support ring 12. This arrangement permits a support ring 12 to be easily removed along with a molded pipe section E for supporting the pipe section E until it is dried, or for cleaning, repair, or replacement by a support ring 12 having a different contour.

The compressing member C comprises a cylindrical upper shell 48 having the compressing ring 14 fixedly attached to its lower edge and two compressing cylinders 49 for forcing the compressing ring 14 downward into the mold M. The diameter of the upper shell 48 is substantially that of the support member S. Thus, the lower edge of the upper shell 48 is insertable into the space between the outer shell 37 and the inner shell 38 of the mold M. The compressing member C is positioned with respect to the mold M by fixedly attaching a suspension member 50 across the upper edge of the upper shell 48 and by attaching a chain 51 from an overhead crane or hoist (not shown) to the suspension member 50. With this arrangement, the chain 51 can be used to raise or lower the compressing member C with respect to the mold M.

The suspension member 50 also serves for mounting the two compressing cylinders 49 outwardly of and on opposite sides of the upper shell 48. The compressing cylinders 49 are double-acting hydraulic cylinders of known type with each compressing cylinder 49 having one end fixedly attached to the suspension member 50 and a piston 52 which is forced downwardly or drawn upwardly in response to hydraulic pressure in hydraulic lines 53 and 54. The operation of the compressing cylinders 49 is conventional and any convenient known source (not shown) of controlled hydraulic pressure may be used to provide hydraulic pressure to the hydraulic lines 53 and 54.

A fastener 55 is fixedly attached to the lower end of one of the pistons 52 and a fastener 56 is fixedly attached to the lower end of the other piston 52. Each fastener 55 or 56 comprises two tabs 57 spaced apart and extending downwardly from the piston 52 and a pin 58 fixedly extending between the tabs 57. Fixedly attached to and extending upwardly from the strut member 30 is a hook member 59 and fixedly attached to and extending upwardly from the strut member 31 is a hook member 60. The hook members 59 and 60 are positioned so that when the compressing member C is lowered by the chain 51 so as to place the lower edge of the upper shell 48 in the mold M, the hook member 59 will engage the pin 58 of the fastener 55 and the hook member 60 will engage the pin 58 of the fastener 56. It will be understood that with the hook members 59 and 60 engaging the pins 58 of the fasteners 55 and 56, retraction of the pistons 52 force the compressing ring 14 downward into the mold M and it will also be understood that the hook members 59 and 60 and the fasteners 55 and 56 permit the compressing member C to be easily positioned with respect to the mold M for downward motion of the compressing member C and to be easily and quickly removed from adjacent the mold M.

The compressing ring 14 serves to close the upper end of the space between the outer shell 37 and the inner shell 38 of the mold M when the mold M is in a raised position and the specific shape or contour of the compressing ring 14 is selected in accordance with the shape or contour which it is desired to provide the upper end of a pipe section E joined by the molding machine. In the specific embodiment of the invention described herein, the compressing ring 14 has an inner annular segment 61 fixedly attached to the lower edge of the upper shell 48, an outer annular segment 62 concentric with the inner annular segment 61 and below the lower edge of the upper shell 48, and an inclined segment 63 extending upwardly from the outer annular segment 62 to the inner annular segment 61. With this contour, the compressing ring 14 provides a flange 64 on a pipe section E which is insertable into the peripheral lip 45 formed on a pipe section E by the support ring 12.

*Operation*

From the foregoing, it will be apparent that when a pipe section E is to be molded by the molding machine disclosed herein, the mold M is raised by the cylinder units 15 until the support ring 12 is in the lower end of the mold M. With the mold M firmly held in this raised position by hydraulic pressure in the cylinder units 15 and with the compressing member C removed from above the mold M by the chain 51, concrete or similar material is easily and conveniently placed in the upper end of the mold M from any convenient known source such as a hopper (not shown).

After the selected amount of concrete or similar material has been placed in the mold M, the compressing member C is moved into position over the mold M by the chain 51 and the fasteners 55 and 56 are engaged by the hook members 59 and 60. When the compressing member C is in this position, the compressing ring 14 is in the mold M above the material such as concrete in the mold M. Thus, the material in the mold M is completely enclosed by the outer shell 37 and the inner shell 38 of the mold M, the support ring 12, and the compressing ring 14.

It will now be understood that with the material in the mold M completely enclosed, downward motion of the mold M causes the material in the lower end of the mold M to move upward relative to the mold M and downward motion of the compressing ring 14 causes the material in the upper end of the mold M to move downward within the mold M. Thus, by lowering the mold M and the compressing ring 14 simultaneously or alternately, the material in the mold M is compressed and moved relative to the mold M from both the upper end and lower ends of the mold M. It has been found that the compressing of the material in the mold M by motion of the material relative to both ends of the mold M provides a uniform distribution or concentration at high density of a material such as concrete throughout even the relatively long closely-spaced mold M required for a large pipe section E having thin walls.

The uniform distribution of the material throughout the mold M can be further insured by using the cylinder units 15 to impart a relatively rapid reciprocating motion of small magnitude to the mold M as the material is placed in the mold M or by using other means (not shown) to vibrate or shake the mold M as the material is placed in the mold M. However, the compression described above is adequate to obtain a high quality pipe section E having the shape defined by the mold M, the support ring 12, and the compressing ring 14.

Once the pipe section E is molded, the compressing member C is removed from above the mold M and the mold M is lowered until the support ring 12 is above the mold M. This places the pipe section E above the mold M where it may be easily removed from the molding machine and transported by fork lift (not shown) or means to an adjacent area for curing. In this connection, it will be understood that the concrete slab 17 may be the bottom of a pit so as to place the molded pipe section E at floor level or it may be a portion of a floor above which a platform is constructed for easy removal of the pipe section E from the molding machine.

It will be obvious to those skilled in the art that many variations may be made in the embodiments chosen for the purpose of illustrating the present invention without departing from the scope thereof as defined by the appended claims.

What is claimed as invention is:

1. A pipe moulding machine including a base, a cylindrical upright support fixedly mounted on said base, said support extending vertically from said base a distance substantially equal to the length of pipe to be moulded by said machine, a united inner and outer pair of coaxial mould shells substantially equal in length to the vertical extent of said support, defining therebetween a cylindrical mould space adapted to receive said support, a support ring on the upper end of said support, extending between said inner and outer shells, a compressing ring axially spaced from said support ring extending between said inner and outer shells, means for moving said shells downwardly to cause compression of material in the lower end of said mould space by said support ring, means for moving said compression ring downwardly with respect to said shells to cause compression of material in the upper end of said mould space and means for moving said shells independently of both of said rings beyond the plane of both of said rings to expose a finished pipe section.

2. The machine as set forth in claim 1 in which said means includes mechanism for moving said shells and said compression ring in unison with respect to said support and said support ring.

3. The mechanism as set forth in claim 1 including mechanism for moving said inner and outer shells in unison and means for moving said compression ring independently of said inner and outer shells.

4. The machine as set forth in claim 3 in which said means includes mechanism for moving said compression ring towards said support ring and with respect to said inner and outer shells.

References Cited by the Examiner

UNITED STATES PATENTS

| | | | |
|---|---|---|---|
| 1,399,325 | 12/1921 | Straub | 25—41 |
| 1,494,953 | 5/1924 | Cross | 25—41 |
| 1,693,429 | 11/1928 | Austin | 264—69 |
| 2,091,385 | 8/1937 | Trickey | 25—30 |
| 2,209,404 | 7/1940 | Lassman | 18—16.5 |
| 2,483,498 | 10/1949 | Lewon et al. | 264—69 |
| 3,078,539 | 2/1963 | Duplessis | 25—126 |
| 3,141,222 | 7/1964 | Steiro | 25—30 |
| 3,178,791 | 4/1965 | Dickson et al. | 25—41 |
| 3,201,843 | 8/1965 | Osweiler | 25—30 |

FOREIGN PATENTS 878,324   4/1953   Germany.

J. SPENCER OVERHOLSER, *Primary Examiner.*

G. A. KAP, R. S. ANNEAR, *Assistant Examiners.*